(12) United States Patent
Mosdal et al.

(10) Patent No.: US 6,213,219 B1
(45) Date of Patent: Apr. 10, 2001

(54) COMPACT HINGE ASSEMBLY FOR A FOLDING IMPLEMENT

(75) Inventors: Brian Thomas Mosdal, Ankeny; James Thomas Noonan, Johnston; David Alan Payne, Urbandale; Paul David Parker, Ankeny, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/419,399

(22) Filed: Oct. 15, 1999

(51) Int. Cl.[7] .................................................. A01B 73/04
(52) U.S. Cl. ................................................................ 172/311
(58) Field of Search .................... 172/311, 316, 172/452, 456; 239/168

(56) References Cited

U.S. PATENT DOCUMENTS 3,948,327   4/1976   Parker et al. .................... 172/311

Primary Examiner—Christopher J. Novosad

(57) ABSTRACT

A flat fold hinge assembly for implement frame sections that fold substantially greater than 90 degrees includes a modular hinge having first and second hinge portions that bolt solidly to the frame sections. A folding cylinder is protectively cradled between the sides of a cast mounting bracket closely adjacent the frame tube. Floating links are connected to the rod end of the cylinder generally below the main pivot which is offset above the frame tube a distance substantially less than most previously available hinge structures for compact storage of the wing frame close to the inner frame. The design, preferably utilizing four cast components, is more compact than previous designs so the frame sections fold more compactly. The simple mounting arrangement provides versatility in locating the hinge assembly to accommodate a wide variety implement configurations and implement attachments. The hinge structure acts to reinforce the tubular frame construction and distribute heavy loads transferred from implement attachments and tools. A mounting area on the hinge facilitates connection of additional hardware such as a wing support tube truss.

21 Claims, 4 Drawing Sheets

COMPACT HINGE ASSEMBLY FOR A FOLDING IMPLEMENT

BACKGROUND OF THE INVENTION

1) Field of the Invention

The present invention relates generally to agricultural implements and, more specifically, to multi-sectioned folding implements such as field cultivators and chisel plows.

2) Related Art

Wide agricultural implements often include a foldable frame structure with a wing frame connected by hinges to the end of an adjacent main frame. The wing frame typically is folded 170 to 180 degrees over the main frame so the frames are near or in a parallel condition for transport. On a five section machine, the outer wing is folded over the inner wing. Current hinges include those generally of the type shown in U.S. Pat. No. 3,948,327 which include a weldment having a folding cylinder mounted a substantial distance above the frame. Floating links extending above the cylinder are connected to the rod end of the cylinder and to the adjacent frame sections. Typically, the floating links are located above the main pivot area. These hinge structures have numerous parts and a substantial vertical component. Such structures provide an obstruction which prevents other linkages and hardware from being mounted near the hinge area. Usually, the hinge can only be placed at one location, typically at the end of a given rank on the implement. The folding cylinders on most multi-sectioned implements remain generally in the open and unprotected. Some toolbars utilize cylinders mounted within the frame tube, but these are difficult to mount and access and usually require a ramping arrangement on the folding linkage structure connected to the cylinder rod end.

BRIEF SUMMARY OF THE INVENTION

It is therefore an object of the present invention to provide an improved hinge assembly for an implement. It is a further object to provide such an assembly which overcomes most or all of the aforementioned problems.

It is a further object of the present invention to provide an improved hinge assembly for an implement which has a low, compact profile and facilitates mounting of additional hardware in the hinge area. It is another object of the present invention to provide an improved implement hinge assembly which has fewer parts, is easier to mount at different locations on a frame, and is stronger than most previously available hinge assemblies. It is still a further object to provide such an assembly which protects the folding cylinder without hindering access to the cylinder.

It is another object of the present invention to provide an improved implement hinge assembly which is more compact and provides a more compact implement transport position than at least most previously available hinge assemblies. It is a further object to provide such an assembly which has a modular design and substantially increases implement design flexibility compared to most previously available assemblies. It is another object to provide such an assembly which reinforces the hinge mounting area of the implement frame.

A flat fold hinge assembly for implement frame sections that fold substantially greater than 90 degrees includes a modular hinge having first and second hinge portions that each mount solidly to the frame sections using a simple bolt mounting arrangement. A folding cylinder is protectively cradled between the sides of the mounting bracket on the first hinge portion closely adjacent the frame tube and is accessible for maintenance and repair. Floating links are connected to the rod end of the cylinder generally below the main pivot which is offset above the frame tube a distance substantially less than most previously available hinge structures for compact storage of the wing frame close to the inner frame. The design preferably utilizes several cast components, rather than a weldment. The mechanism has fewer yet stronger components, and is more compact than previous designs so the frame sections fold more compactly. The simple mounting arrangement provides versatility in locating the hinge assembly to accommodate a wide variety of implement configurations, and such versatility is enhanced by the compact hinge assembly design that allows mechanical components such as wheel module linkages to pass through the flat fold hinge area. The hinge assemblies can be utilized in different combinations and placed as necessary on any ranks. The assembly actually reinforces the hinge mounting area for added strength and includes a mounting area for directly attaching a component such as a wheel module.

These and other objects, features and advantages of the present invention will become apparent to one skilled in the art upon reading the following detailed description in view of the drawings.

DETAILED DESCRIPTION OF THE DRAWINGS

Figure 1:
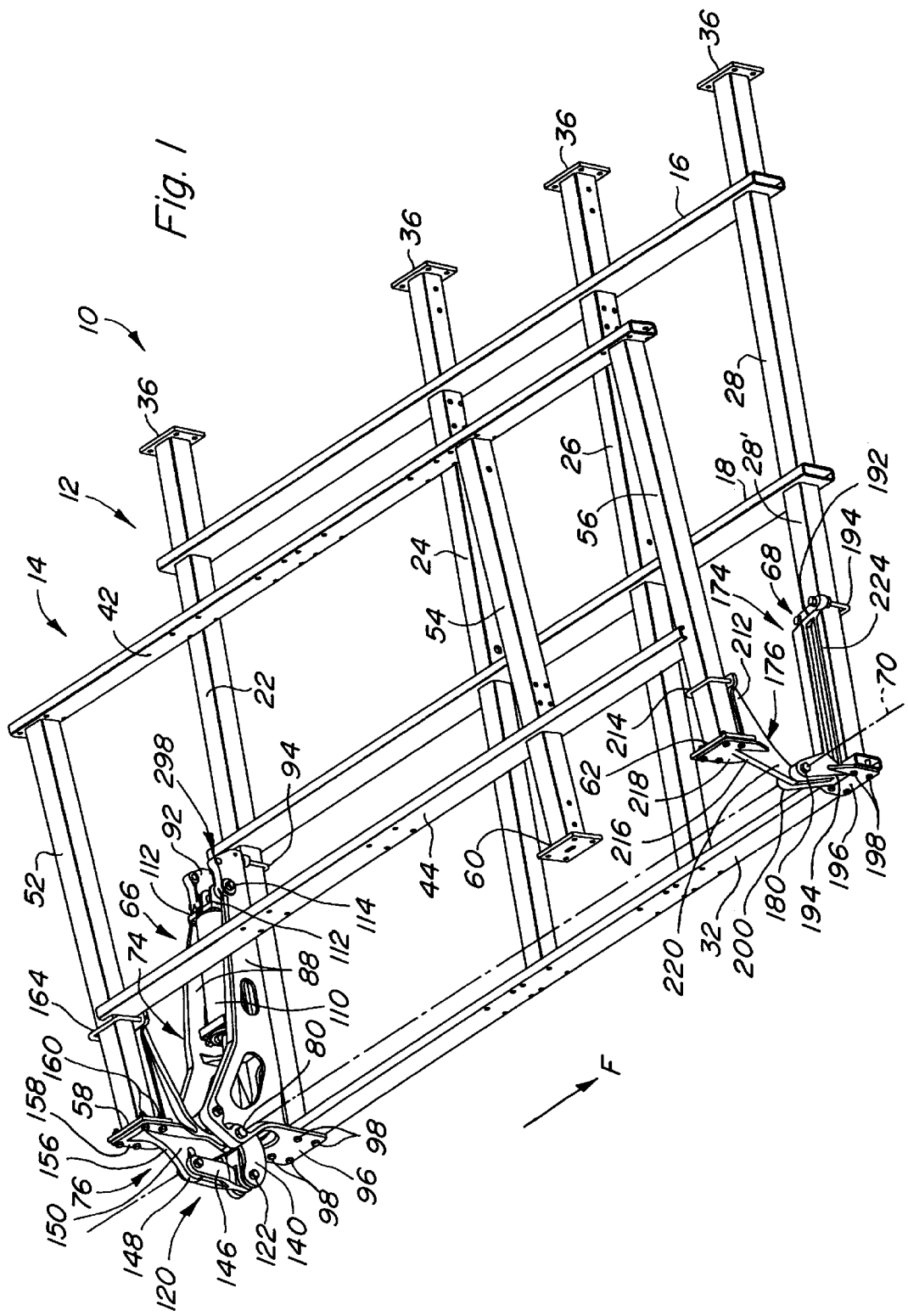
FIG. 1 is a perspective view of a portion of a frame for a folding implement, with parts removed to more clearly show the hinge areas, showing the wing frame in the folded storage position.

Referring now to FIG. 1, therein is shown a frame portion 10 for a field cultivator, chisel plow or similar framed agricultural implement. The frame portion 10 includes a main or inner wing frame section 12 and a wing or outer wing frame section 14 which are generally rectangular in configuration and support conventional earthworking tools and support wheel modules.

The main frame section 12 includes fore-and-aft extending tubes 16 and 18 which are apertured to receive transversely extending tubes or ranks 22, 24, 26 and 28. The outermost ends of the tubes 22–28 are fixed to an outermost end tube 32. The innermost ends of the tubes 22–28 include mounting plates 36 adapted for connecting the section 12 to an adjacent frame section. The section 12 is supported for forward movement over the ground with the top surfaces of the tubes 22–28 lying generally in a horizontal plane.

The wing frame section 14 includes an outer fore-and-aft extending tube 42 and an inner fore-and-aft extending tube 44 supporting three or more transversely extending tubes or ranks 52, 54 and 56. The tubes 52–56 project inwardly from the tube 44 and terminate in plates 58, 60 and 62 which lie generally along a plane perpendicular to a plane defined by the section 14. In the folded transport position of the frame portion 10 shown in FIG. 1, the wing frame section 14 is pivoted approximately 180 degrees from an extended field-working position and overlies the frame section 12.

The frame section 14 is connected to the frame section 12 by hinge structures 66 and 68 connected to the tubes 22, 32, 52 and 28, 32, 56 respectively, for pivoting about a section fold axis 70. An additional hinge structure 68 (not shown) may be provided to connect the areas adjacent the ends of the transverse tubes including tubes 26 and 54.

The hinge structure 66 includes a first hinge portion 74 connected to the tubes 22, 32 of the frame section 12, and a second hinge portion 76 connected to the tube 52 and plate 58 of the frame section 14. The hinge portions 74 and 76 are connected by a main pivot pin 80 for pivoting relative to each other about the axis 70.

The first hinge portion 74 is channel-shaped and opens upwardly (FIG. 1). The hinge portion 74 includes a lower portion 84 located adjacent but offset about one inch above upper face 22' of the tube 22 and parallel sidewalls 88 extending upwardly from the lower portion 84. An innermost end 92 is connected by a U-bolt 94 to the tube 22 adjacent the fore-and-aft tube 18. A truss tube (not shown) may be added between an apertured area adjacent the end 92 and the opposite side of the frame section 12 to provide extra frame strength, rigidity and support. The hinge portion 74 extends outwardly from the end 92 over the tube 22 and terminates in an integral outer connecting plate 96 which projects downwardly adjacent the outer face of the tube 32. Two pairs of bolts 98 located on opposite faces of the tube 22 secure the plate 96 against the tube 32 to support the outer end of the first hinge portion 74. The outer end of the hinge portion 74 extends upwardly to main pivot locations 100 in the sidewalls 88 which support the pivot pin 80 above and slightly outwardly of the outer face of the tube 32. Link pivot supports 102 are located in the sidewalls 88 inwardly from and above the pivot locations 100 directly above the tube 32. The upper edges of the sidewalls 88 angle downwardly from the locations 100 to the innermost end 92.

A hydraulic cylinder 110 is protectively cradled between the sidewalls 88 closely adjacent the lower portion 84 of the hinge portion 74. The cylinder 110 includes a base end 112 pivotally connected by a pin 114 to the innermost hinge end 92, and a rod end 116 pivotally connected to a linkage 120 by a pin 122. The linkage 120 is pivotally connected between the area 102 and the second hinge portion 76 and maintains the rod end 116 below the pivotal axis 70 in both the transport (FIGS. 1 and 2) and field-working (FIG. 3) positions of the frame and as the frame section 14 is pivoted about the axis 70 between the positions by extension and retraction of the cylinder 110. The cylinder 110 defines a cylinder axis 130 which forms an acute angle with the plane of the frame section 12. The acute angle preferably is below ten degrees over the full pivot range of the section 14 relative to the section 12 and the cylinder is supported closely adjacent the top face 22' to maintain a low hinge profile.

Figure 3:
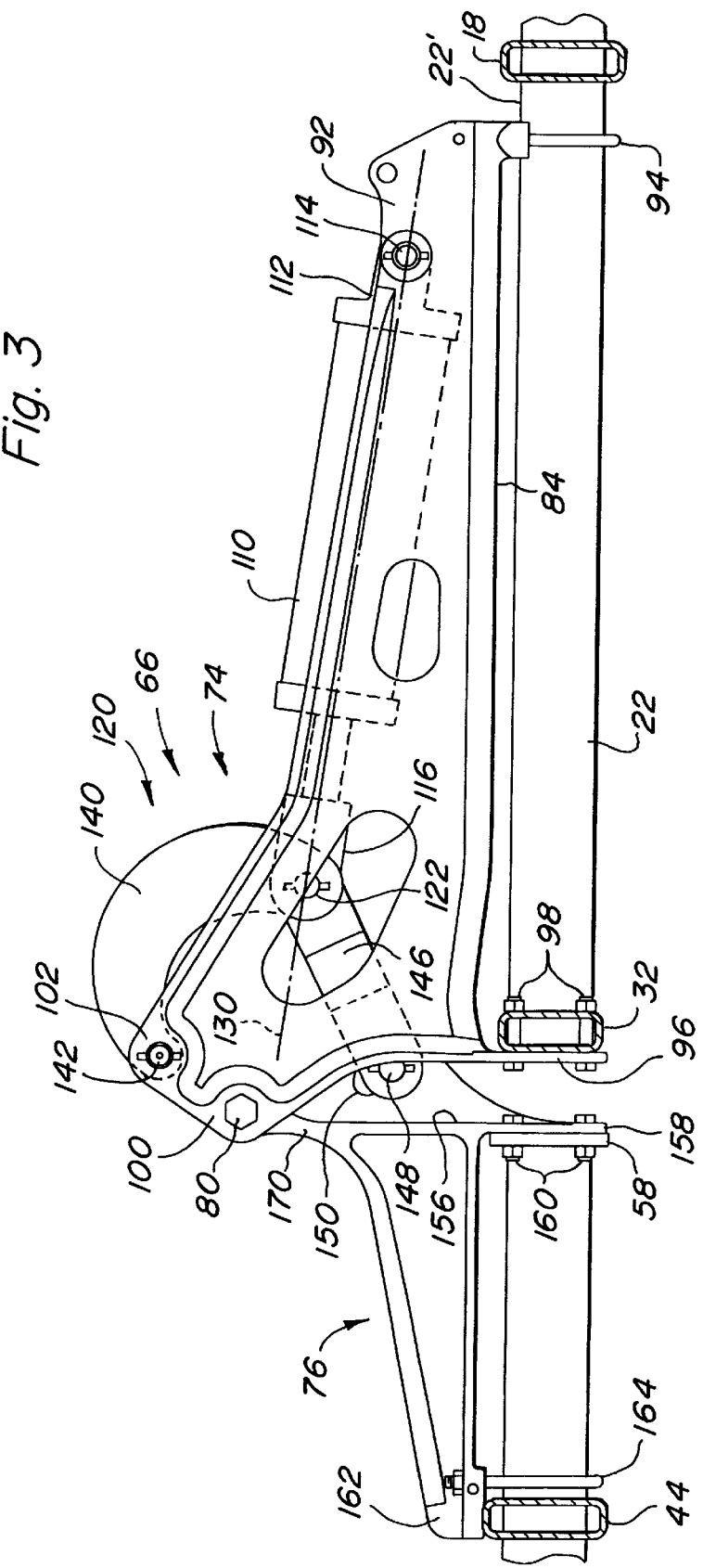
FIG. 3 is a plan view of the hinge area similar to that of FIG. 2 but showing the hinge area when the implement is in the unfolded field-working position.

The linkage 120 includes a curved first link 140 having an upper end pivotally connected by a pin 142 between the pivot supports 102 and a lower end connected to the cylinder rod end 116 and to one end of a second link 146 by the pin 122. The opposite end of the second link 146 is connected by a pin 148 to a slotted member 150 projecting generally radially from the area of the pivot axis 70 on the second hinge portion. With the cylinder 110 retracted so the frame is in the field-working position (FIG. 3), the cylinder rod end pin 122 is located slightly above the link pin 148 and below and inwardly of the main pivot pin 80. As shown in FIG. 3, the cylinder axis 130 intersects the plane of the first section frame 12 at an angle of approximately eight degrees.

Figure 2:
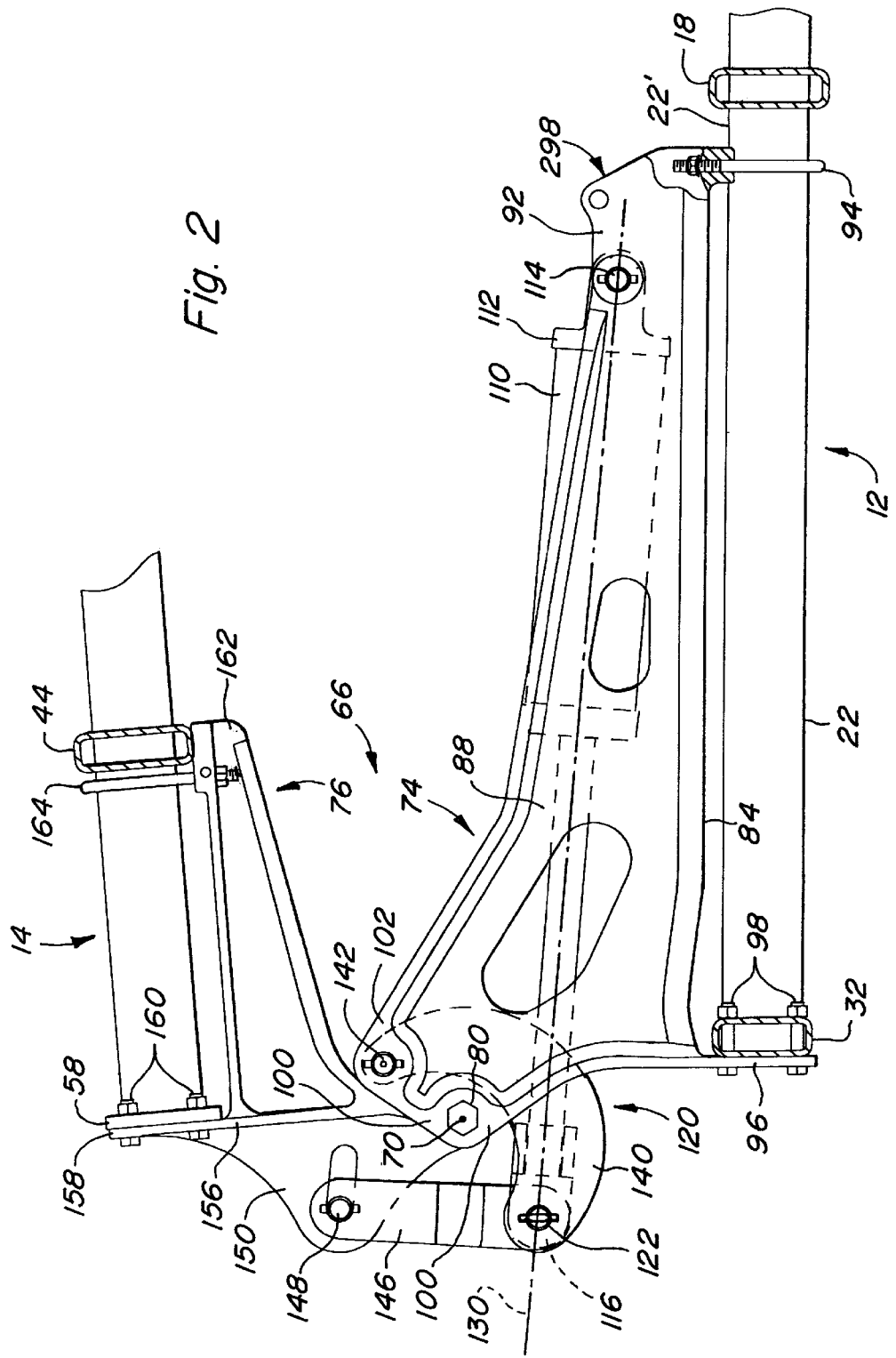
FIG. 2 is an enlarged plan view of the hinge area on the frame portion shown in FIG. 1.

Extension of the cylinder 110 rotates the curved first link 140 in the clockwise direction as viewed in FIGS. 2 and 3 to move the section 14 to an over-center position and into the transport position of FIGS. 1 and 2. In the transport position, the cylinder rod end pin 122 is located outwardly of and below the main pin 80 and the link pin 148, and the curved link 140 embraces the pin 80. As shown in FIG. 2, the cylinder axis intersects the plane of the first section frame 12 at an angle of approximately four degrees. The barrel of the cylinder 110 remains closely adjacent the top surface 22' over the full range of folding (slightly less than 180 degrees as shown in FIG. 2) and is protected by the sidewalls 88. The axis of the base end pin 114 is located above the top surface 22' a distance only slightly more than half the diameter of the cylinder 110 to help maintain a very low hinge profile. The main pivot pin 80 defining the pivotal axis 70 is located a relatively small distance (between two and three times the cylinder diameter as shown in the drawings) above the tube 22 to provide a low transport position profile (FIG. 2).

The second hinge portion 76 includes an end portion 156 supporting the slotted member 150 and extending downwardly (FIG. 3) to a connecting plate 158 connected by four bolts 160 to the plate 58. The hinge portion 76 extends over the tube 52 and terminates at an end 162 which abuts the top of the tube 44 and is secured in position to the tube 52 by a U-bolt 164. A pivot area 170 is located adjacent the slotted member 150 between the sidewalls 88 and receives the main pivot pin 80.

The non-powered hinge structure 68 includes a first hinge portion 174 (FIGS. 1 and 4) connected to the tubes 28, 32 of the frame section 12, and a second hinge portion 176 connected to the tube 56 and the plate 62 of the frame section 14. The hinge portions 174 and 176 are connected by a pivot pin 180 for pivoting relative to each other about the axis 70.

The hinge portion 174 includes an innermost end 192 connected by a U-bolt 194 to the tube 28 between the tubes 18 and 32. The hinge portion 174 extends outwardly over the top of the tube 28 to an end 194 having a downwardly projecting plate 196 which is bolted to the outer face of the tube 32 by two pairs of bolts 198 extending through the tube 32 and located adjacent opposite faces of the tube 28. The portion 174 extends upwardly to a pivot location 200 which supports the pivot pin 180.

The hinge portion 176 includes an end portion 212 connected by a U-bolt 214 to the tube 56 abutting the tube 44. The portion 174 extends towards the end of the tube 56 and includes an end 216 with a plate 218 connected by bolts 219 to the plate 62. The end 216 projects towards the pivotal axis and terminates in a pivot pin receiving area 220.

Figure 4:
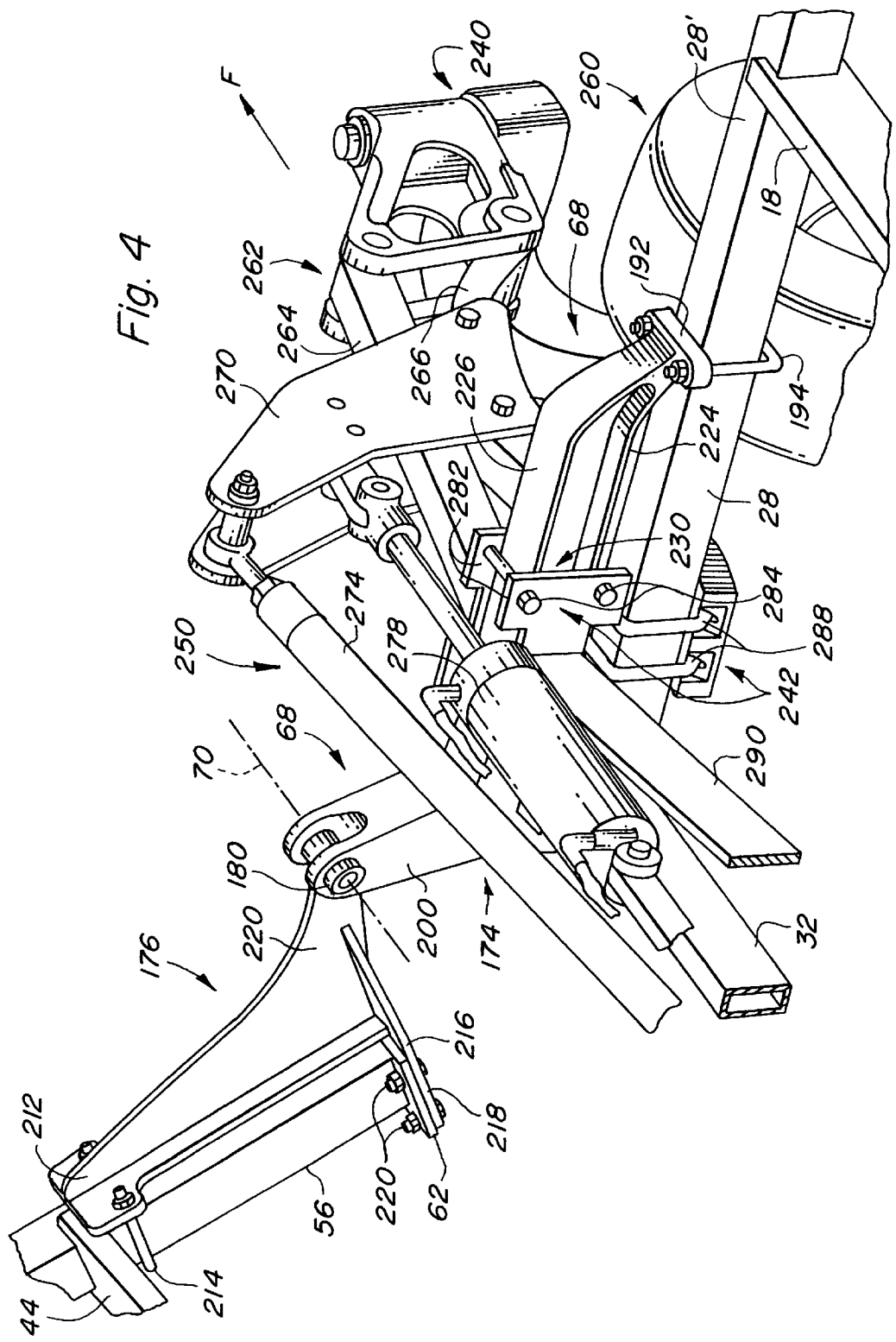
FIG. 4 is a perspective view of a hinge area showing an implement attachment connected to the frame and the hinge area.

The hinge portion 174 includes a bottom portion 224 (FIG. 4) which is offset above and extends parallel to the top 28' of the tube 28, and a top portion 226 defining a rectangular mounting area indicated generally at 230. An implement attachment 240, shown as a lift wheel module in FIG. 4, is connected by bracket structure 242 to the tube 28 and to the mounting area 230 to distribute the load of the attachment 240 to both the tube 28 and the hinge structure 68. The attachment 240 includes fore-and-aft extending linkage, cylinder and support structure indicated generally at 250 which actually, in part, passes between the hinge portions 174 and 176 when the implement is in the folded transport position. The low profile hinge structure described above allows this as well as other implement hardware to be mounted in the hinge area without interference over the entire range of pivoting of the section 14 relative to the section 12.

As shown in FIG. 4, the attachment includes a castor wheel assembly 260 connected to the forward end of a four bar linkage 262. The linkage 262 includes an upper straight link 264 and a lower curved link 266 pivotally connected at their aft ends to the bracket structure 242. A central portion of the lower curved link 266 is connected to a bifurcated arm 270 extending upwardly on opposite sides of the straight link 264. The arm 270 is connected to a link which extends rearwardly to a second lift wheel module (not shown) for operation in unison with the module 240. An implement lift cylinder 278 located closely adjacent the top portion 226 of the first hinge portion 174 powers the lift wheel modules. Hydraulic cylinder anchor bracket structure 280 includes mounting plate structure 282 secured against opposite sides of the mounting area 230 on the first hinge portion 174 by bolts 284. U-bolts 288 including upper legs extending between the offset bottom portion 224 and the top 28' secure bracket structure 242 firmly to the tube 28. The anchor bracket structure 290 extends to a rearwardly adjacent rank (not shown) to provide additional reinforcement to the heavily loaded attachment area.

The hinge portions 74, 76 and 174, 176 are preferably fabricated as castings for strength and reduction in parts and fabrication time. The bolted hinge design facilitates relatively quick and easy mounting of varying number of the hinges at different locations along the frame sections. The cylinder support arrangement for the powered hinge also provides easy access to the cylinder and cylinder ports. Attachment mounting areas, such as shown at 298, are used to attach additional hardware, such as the inner wing support tube truss described above.

Having described the preferred embodiment, it will become apparent that various modifications can be made without departing from the scope of the invention as defined in the accompanying claims.

We claim:

1. In an agricultural implement having first and second frame sections pivotable relative to each other through an angle of substantially greater than 90 degrees between an extended field-working position and a folded transport position, a compact folding hinge assembly comprising:
   a first hinge portion connected to the first section and including a pivot defining a pivot axis offset vertically a first distance above the first frame section;
   a second hinge portion connected to the second section and connected for pivoting about the pivot axis;
   an extendable and retractable folding cylinder having a base end connected to the first hinge portion and a rod end, the cylinder located substantially below the pivot axis; and
   a linkage connected between the rod end and the second hinge portion, the linkage located generally below the pivot axis and moving the frame sections between the field working and transport positions with extension and retraction of the cylinder.

2. The compact folding hinge assembly as set forth in claim 1 wherein the cylinder defines a longitudinal centerline, and wherein the longitudinal centerline passes below the pivot axis in both the field-working and transport positions of the frame sections.

3. The compact folding hinge assembly as set forth in claim 1 wherein the first hinge portion is channel shaped and opens upwardly, and wherein the cylinder is located generally within the first hinge portion.

4. The compact folding hinge assembly as set forth in claim 1 wherein the first frame section includes a tube having a top surface and an outer end, and wherein the first hinge portion includes an inner end, and a u-bolt connecting the inner end to the top of the first frame section, the first hinge portion including an outer end plate, and bolts connecting the outer end plate to the outer end.

5. The compact folding hinge assembly as set forth in claim 1 wherein the linkage include first and second links pivotally connected to each other, the first link having an upper link end pivotally connected to the first hinge portion above the pivot axis and to the rod end below the pivot axis, and wherein the second link is pivotally connected to the rod end and to the second hinge portion.

6. The compact folding hinge assembly as set forth in claim 5 wherein the first link includes a curved section, and when the implement is in the transport position, the curved section embraces the pivot axis.

7. The compact folding hinge assembly as set forth in claim 1 wherein the first frame section includes a tube having a top surface and supports the folding cylinder closely adjacent the top surface, the folding cylinder has a preselected diameter and includes a base end connected at a cylinder pivot to the first frame section, and the cylinder pivot is located above the top surface a distance of approximately half the preselected diameter.

8. In an agricultural implement having first and second frame sections pivotable relative to each other between an extended field-working position and a folded transport position, a compact folding hinge assembly comprising:
   a first hinge portion connected to the first section and including a pivot defining a pivotal fold axis offset vertically a first distance above the first frame section;
   a second hinge portion connected to the second section and connected for pivoting about the pivotal fold axis;
   an extendable and retractable folding cylinder having a base end connected to the first hinge portion, and a rod end;
   linkage structure connected between the first and second hinge portions; and
   a rod end pivot connecting the rod end of the cylinder to the linkage structure and pivoting the frame sections between the field-working and transport positions as the cylinder is extended and retracted, the linkage structure maintaining the rod end pivot generally below the pivotal fold axis in both the field-working and transport positions.

9. The compact folding hinge assembly as set forth in claim 8 wherein the cylinder defines a longitudinal centerline, and wherein the longitudinal centerline passes below the pivotal fold axis in both the field-working and transport positions of the frame sections.

10. The compact folding hinge assembly as set forth in claim 8 wherein the first hinge portion is channel shaped and opens upwardly, and wherein the cylinder is located generally within the first hinge portion.

11. The compact folding hinge assembly as set forth in claim 8 wherein the first frame section includes a tube having a top surface and an outer end, and wherein the first hinge portion includes an inner end, and a bolt connecting the inner end to the top of the first frame section, the first hinge portion including an outer end plate, and bolts connecting the outer end plate to the outer end.

12. The compact folding hinge assembly as set forth in claim 8 wherein the linkage structure includes first and second links pivotally connected at the rod end pivot, the first link having an link end pivotally connected to the first hinge portion above the pivotal fold axis and an opposite end connected to the rod end pivot below the pivotal fold axis.

13. The compact folding hinge assembly as set forth in claim 12 wherein linkage structure maintains the rod end pivot below the pivotal fold axis as the sections are pivoted relative to each other between the field-working and transport positions.

14. The compact folding hinge assembly as set forth in claim 8 wherein the folding cylinder has a preselected diameter, and wherein the first distance is less than approximately twice the preselected diameter.

15. The compact folding hinge assembly as set forth in claim 8 wherein the first frame section lies generally in a horizontal plane, the second frame section is foldable approximately 180 degrees from the extended field-working position to the folded transport position, and the cylinder defines a centerline, and where an angle defined by the centerline and the horizontal plane is substantially less than ten degrees in extended field-working and folded transport positions.

16. In an agricultural implement having first and second frame sections adapted for forward movement over the ground, the first frame section including a transversely extending tubular member supporting an implement attachment which transmits a load to the first frame, the sections pivotable relative to each other between an extended field working position and a folded transport position, a folding hinge assembly comprising:

a first hinge portion connected to the first section including an integral mounting area extending adjacent the tubular member;

a second hinge portion connected to the second section and pivotally connected to the first hinge portion and facilitating pivoting of the first and second frame sections relative to each other; and a connector securing the implement attachment to the mounting area to thereby transfer a portion of the load to the first hinge portion.

17. The folding hinge assembly set forth in claim 16 wherein the implement attachment comprises a lift wheel assembly connected to the tubular member, the lift wheel assembly including a bolt receiving area, and wherein the connector includes a bolt member extending between the bolt receiving area and the mounting area.

18. The folding hinge assembly set forth in claim 16 wherein the first hinge portion includes a plate bolted to an end of the tubular member and a support member extending transversely from the plate generally parallel to the tubular member and including an inner end, and bolt structure securing the inner end to the tubular member.

19. The folding hinge assembly set forth in claim 16 wherein the first hinge portion comprises a casting having a face and wherein the connector secures the implement attachment to the face.

20. The folding hinge assembly set forth in claim 19 wherein the first hinge portion is secured to the tubular member on opposite sides of the face.

21. The folding hinge assembly set forth in claim 16 wherein the first hinge portion includes a truss-receiving portion adapted for receiving a section reinforcing member.

* * * * *